Figure 4:
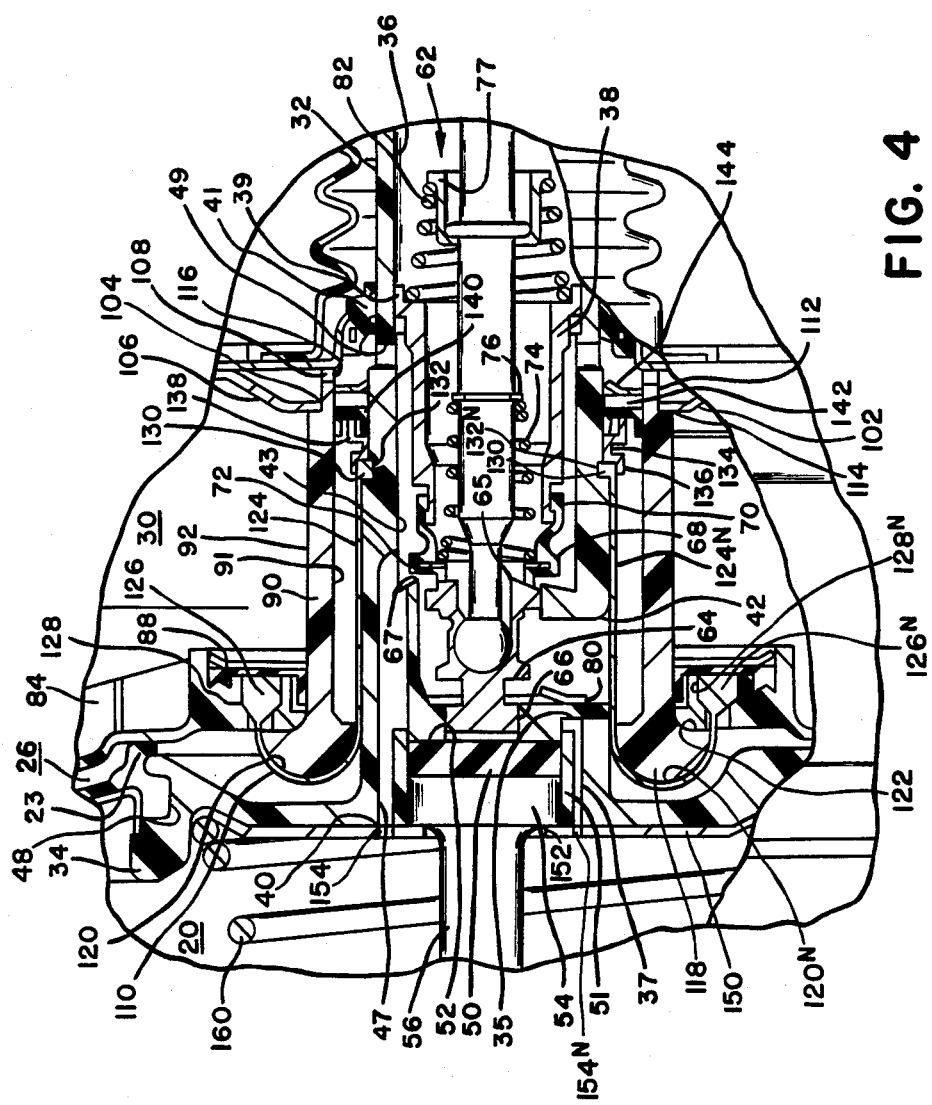

United States Patent [19]

Rossigno et al.

[11] Patent Number: 4,665,800

[45] Date of Patent: May 19, 1987

[54] TANDEM BRAKE BOOSTER

[75] Inventors: Louis P. Rossigno, Granger; Keith H. Fulmer, Mishawaka, both of Ind.

[73] Assignee: Allied Corporation, Morristown, N.J.

[21] Appl. No.: 772,063

[22] Filed: Sep. 3, 1985

[51] Int. Cl.⁴ .............................................. F15B 9/10
[52] U.S. Cl. .................................. 91/376 R; 91/534; 60/547.1
[58] Field of Search .......................... 92/50, 69 R, 75; 91/376 R, 534; 60/547.1

[56] References Cited

U.S. PATENT DOCUMENTS

| 4,387,626 | 6/1983 | Myers | 91/376 R |
| 4,480,526 | 11/1984 | Carré | 91/374 |

Primary Examiner—Carroll B. Dority, Jr.
Attorney, Agent, or Firm—Leo H. McCormick, Jr.; Ken C. Decker

[57] ABSTRACT

A tandem brake booster (10) having a first wall (24) and a second wall (28) which move in opposite directions in response to a pressure differential created by allowing air to be communicated to a control chamber (26) while vacuum is present in operational chambers (20) and (30). As wall (28) moves straps (124 ... 124$^N$) pulls an annular projection (32) to combine the force produced in the second wall (28) with the force produced in the first wall (24). As the operational force is transmitted into push rod (56) from hub (34), sleeve (37) prevent the reaction disc (50) from being extruded into passage (40) and as such, the reaction force is carried into plunger (64) to provide an operator with an indicator of the operation of the brake booster (10).

5 Claims, 4 Drawing Figures

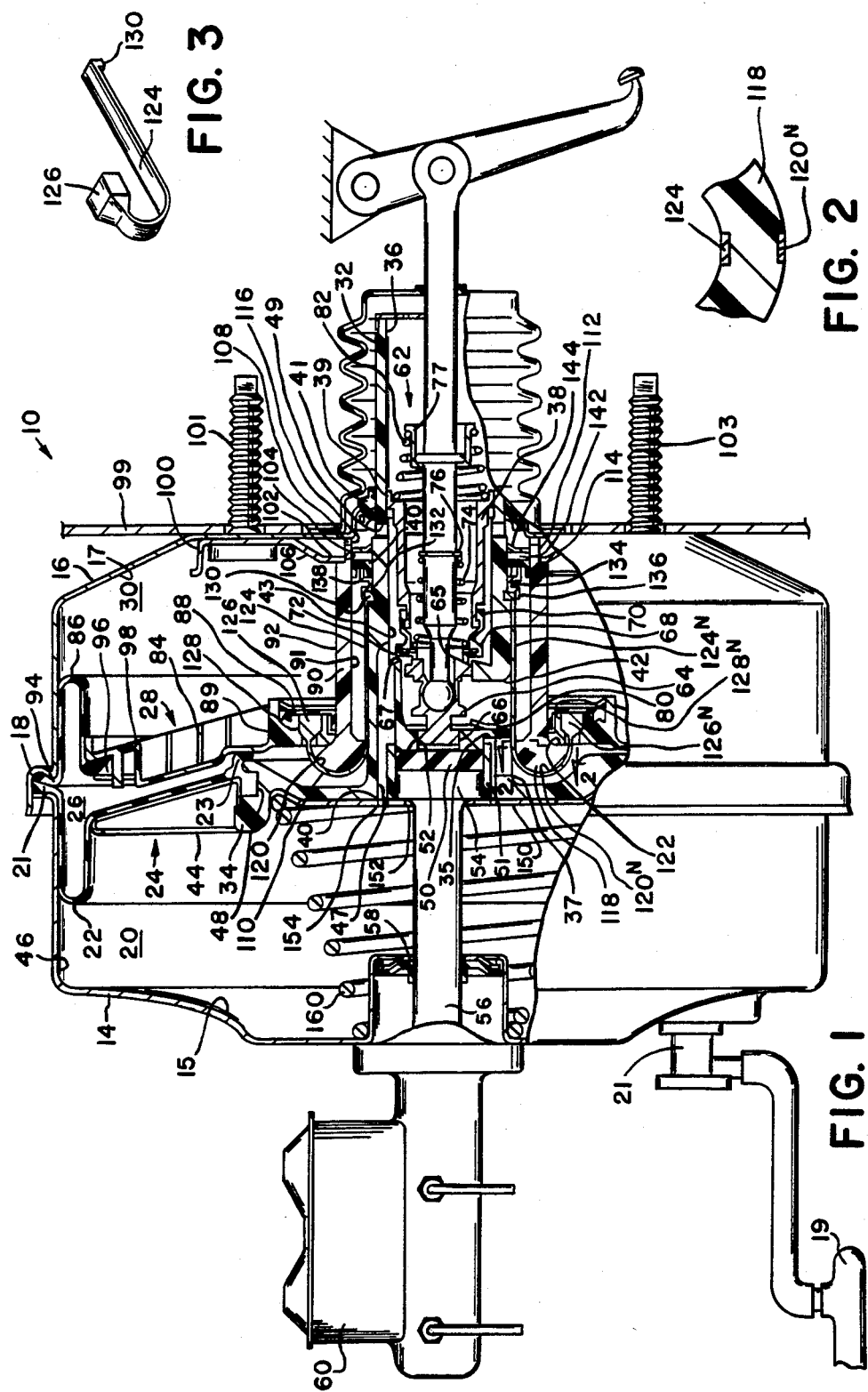

TANDEM BRAKE BOOSTER

This invention relates to a tandem brake booster having a strap arrangement for pulling a first wall in response to movement of a second wall.

In U.S. Pat. No. 4,480,526 a cable attached to the front shell of a vacuum brake and a movable wall goes around a roller on an output member. The roller changes the motion of the wall such that the wall and output member move at different rates.

This invention is a modification of the tandem brake booster disclosed in U.S. Pat. No. 4,387,626 wherein a lever arrangement transmits motion from a second wall into a first wall. While this lever arrangement functions in an adequate manner, the space required for the levers is considerable and as such could be utilized as increase in the operational output stroke of the vacuum brake booster.

In an effort to reduce the size of a tandem brake booster, it was determined that the lever arrangement should be revised or eliminated. It was found a series of straps that attached to the first and second walls could be used to transfer the output force from the second wall into the first wall. The first wall has an annular projection that extends through the second wall and housing. The first wall and annular projection have a series of passages that connect the first chamber, second and third chambers. A control valve carried by the annular projection interrupts the communication of fluid to the second chamber and allows an operational fluid to enter the second chamber and produce a pressure differential that moves the first and second walls in opposite directions. A cylindrical guide located between the second wall and annullar projection has a shoulder on one end through which reaction forces are transmitted to a plate. The plate uniformly distributes reaction forces to a rear shell. The guide has a groove on the other end. The straps which have a rectangular shape slide in the groove to pull on the annular projection as the second wall moves. Thus, the second output force is combined with the first output force to produce an operational force. A sleeve which surrounds a reaction disc prevents the reaction disc from being extruded into the passage that connects the first chamber with the control valve. Thus the control valve receives an accurate indication of the output force being communicated to the output member.

An advantage of this tandem brake booster resides in its compactness whereby in the rest position, the first and second movable walls substantially abut each other and as a result the entire cavity can be used for defining the operational stroke of the vacuum brake booster.

It is an object of this invention to provide a vacuum brake booster having a first wall that moves in a first direction and a second wall that moves in an opposite direction with a strap that slides in a groove in a guide member to transfer the movement of the second wall into the first wall and provide an output member with an operational force corresponding to an input force.

These advantages and objects should be apparent from reading this specification while viewing the drawing wherein:

FIG. 1 is a sectional view of a tandem brake booster made according to the principles of this invention; and FIG. 2 is a sectional view taken along line 2—2 of FIG. 1; and FIG. 3 is a perspective view of the strap for pulling the second wall of the brake booster of FIG. 1, and FIG. 4 is an enlarged sectional view of the interior of the brake booster in FIG. 1.

The tandem brake booster 10 shown in FIG. 1 has a housing made of a front shell 14 and a rear shell 16 joined together by a band 18. The interior of the housing is divided into a first chamber 20, whose limits are defined by the front shell 14 and a first wall 24, a second chamber 26, whose limits are defined by the first wall 24, sidewall 46 of the housing and a second wall 28, and a third chamber 30 whose limits are defined by the second wall 28, rear shell 16 and a cylindrical projection 32 extending from the first wall 24.

The first wall 24 includes a diaphragm 22 and hub member 34. Hub member 34 has an annular backing plate 44 attached thereto that radiates toward the sidewall 46 of the housing. A first bead 21 on diaphragm 22 is retained by band 18 and a second bead 23 is located in a groove 48 on the hub member 34 to seal the second chamber 26 from the first chamber 20. The hub member 34 has an annular projection 32 that extends through opening 41 in shell 16. An axial bore 36 which extends through the annular projection 32 and hub member 34 has an opening 40 into chamber 20 and an opening 42 into chamber 26.

A reaction disc 50 located in bore 36 adjacent shoulder 52 forms a base for head 54 on push rod 56. Push rod 56 which extends through an opening 58 in shell 14 is connected to master cylinder 60. The master cylinder 60 is connected to the wheel brakes of a vehicle.

A valve 62 located in bore 36 has a plunger 64, that engages the bearing surface 66 adjacent shoulder 52, and a poppet 68. A first end 70 of the poppet 68 is fixed to cylinder 38 and a second end 72 is free to move within the bore 36. A first spring 74 located between the second end 72 of the poppet 68 and a retainer 76 on push rod 78 urges the second end 72 into engagement with atmospheric seat 65 of plunger 64 to allow free connection between the first chamber 20, second chamber 26 and third chamber 30 by way of passages 47, passage extension 43, and cross bore 49 in annular projection 32. A second spring 82 located between retainer 77 and shoulder 39 on cylinder 38 urges the plunger 64 into engagement with a key 80 to retain valve 62 in bore 36.

The second wall 28 includes a disc member 84 and a diaphragm 86. A seal 88 located on rib 89 of the disc member 84 engages the peripheral surface 92 on the cylindrical guide 90. Diaphragm 86 has a first bead 94 that engages bead 21 on diaphragm 22 to seal chamber 26 from the surrounding environment and a second bead 96 that is located in a groove 98 on disc 84 to seal the second chamber 26 from the third chamber 30.

A reinforcing plate 100 is attached to shell 16 by bolts 101 and 103. Reinforcing plate 100 has an annular rib 102 that surrounds an opening 104. A series of slots or holes 106 connect chamber 30 with passage or cross bore 49. The slots or holes 106 assures that fluid communication is unhampered between chamber 30 and cross bore 49.

The cylindrical guide 90 has a first end 108 and a second end 110. The first end 108 has a land 112 that extends to shoulder 114. The land 112 projects through opening 104 until shoulder 114 engages annular rib 102. Even though end 108 is not necessarily designed to engage housing 16, a series of openings or slots 116 are provided to aid in permitting free fluid communication to take place between cross bore 49 and chamber 30.

As best seen in FIGS. 1, 2 and 4, end 110 has a semi spherical head 118 with transverse radial grooves or slots 120 . . . 120$^N$ located thereon that extend from face 122. A series of straps 124, . . . 124$^N$ which have a rectangular cross section are located in grooves or slots 120 . . . 120$^N$. As shown in FIG. 3, each strap 124 . . . 124$^N$ has a corresponding head 126 . . . 126$^N$ that is located in an opening 128 . . . 128$^N$ in rib 89 on wall 28 and a bead 130 . . . 130$^N$ located in openings or recesses 132 . . . 132$^N$ in annular projection 32.

A retainer 134 has a first annular section 136 that engages each bead 130 . . . 130$^N$ to hold the same in openings or recesses 132 . . . 132$^N$ and a second annular section 138. A seal 140 and bearing 142 are located adjacent the second annular section 138 by a clip member 144. Seal 140 is carried by the annular projection 32 and engages surface 91 on a guide 90 to assure that chamber 26 is separated from chamber 30 on movement of wall 24.

In operation, an input force applied to a brake pedal is transferred to push rod 65 to linearly move plunger 64. Initial movement of plunger 64 allows spring 74 to move face 72 against vacuum seat 67 and interrupt vacuum communication to chamber 26. Further movement of plunger 64 moves annular atmospheric seat 65 away from face 72 and allows air present in bore 36 to flow into chamber 26 by way of opening.

With air in chamber 26, a pressure differential is produced across walls 24 and 28. This preessure differential causes forces to develop which act on and move wall 24 toward the end shell 15 of shell 14 and wall 28 toward the end 17 of shell 16. As wall 28 moves, straps 124 . . . 124$^N$ slide in slots 120 . . . 120$^N$ to pull on annular projection 32 and transfer the force produced by the second wall 24 into the annular projection 32 where it is combined with the force produced across the first wall 24. The force in the hub member 34 is carried through the reaction disc 50 into push rod 56 to provide the master cylinder 60 with an operational force coresponding to the input force applied to push rod 65.

As the forces are transmitted through reaction disc 50, sleeve 51 prevents the reaction disc 50 from being extruded into passage 47 and annular extension 37 thereof. Shoulder 35 in bore 36 limits the movement of sleeve 51 in bore 36 while inner lip 152 on plate 150 prevents the sleeve from moving into chamber 20. Plate 150 has openings 154 . . . 154$^N$ that substantially allows unrestricted vacuum communication from chamber 20 to passage 47. Thus, the reaction forces are carried into plunger 64 to balance the input force applied to puşh rod 65.

The reaction forces created by the movement of wall 28 pulling straps 124 . . . 124$^N$ across guide 90 are carried through shoulder 114 into annular rib 102 and uniformly distributed into end 17 by way of plate 100 and bolts 101 connected to stationary wall 99 on the firewall of the vehicle.

On termination of the input force on push rod 65, spring 82 acts on push rod 65 to initially move atmospheric seat 65 on plunger 64 against face 72 to interrupt the communication of air to chamber 26 and thereafter moves face 72 on poppet 68 away from vacuum seat 67 to allow vacuum supplied to chamber 20 from intake manifold 19 by way of check valve 21 to evacuate air from chamber 26. As the pressure differential across walls 24 and 28 is reduced and eventually eliminated, return spring 160 acts on wall 24 to move wall 24 toward shell 16. As the annular projection 32 moves out of the shell 16, straps 124 . . . 124$^N$ pull wall 28 toward wall 24. When wall 28 engages stop or face 122 on guide 90 bumper 23 on diaphragm 22 engages wall 28 to form a substantially compact tandem brake booster where the first and second walls 24 and 28 abut each other.

In evaluating this invention the straps were made of stainless steel and when examined after 50,000 cycles of operation did not exhibit a substantial wear.

It is envisioned that the straps 124 . . . 124$^N$ will be made from other plastic or synthetic material such as Kevlar or carbon reinforced fiber which has a high modulus of elasticity and a low wear rate.

We claim:

1. In a tandem brake booster having a housing with a cavity therein divided into first, second and third chambers by first and second walls, said first wall having an annular projection that extends through said second wall and an opening in said housing, a cylindrical guide connected to said housing and concentric to said annular projection, said second wall engaging said cylindrical guide to seal said second chamber from said third chamber, a control valve located in said annular projection for allowing an operational fluid to be communicated to said second chamber in response to an input force, said operational fluid acting on and moving said first and second wall in opposite directions to produce first and second output forces, said first and second output forces being combined to provide an output member with an operational force corresponding to said input force, the improvement comprising:
    straps means including at least first and second straps, each of which has first and second end portions and a body portion, said body portion having a substantially rectangular cross section, said first end portion being connected to said annular projection and said second end portion being connected to said second wall, said cylindrical guide having a semi-spherical head with transverse radial slots, each of said body portions being aligned in a radial slot, said first and second straps pulling said annular projection on movement of said second wall to directly transfer said second output force into said first wall and pulling said second wall to a rest position against said semi-spherical head on movement of said first wall by a return spring in the absence of said input force.

2. The tandem brake booster, as recited in claim 1 further including:
    a reinforcing plate located adjacent said housing, said reinforcing plate having an annular rib that surrounds a central opening, said cylindrical guide having a shoulder that engages said annular rib, said cylindrical guide carrying reaction forces generated during movement of said second wall into said reinforcing plate for distribution to the housing.

3. The tandem brake booster as recited in claim 2 further including:
    a retainer plate located adjacent said first wall for transmitting a return spring force into the first wall to move the first wall into engagement with said second wall in the absence of an input force on the control valve, said retainer plate having an inward projecting lip that engages the output member to assure that the output member is not lost during shipping prior to being matched with a master cylinder.

4. The tandem brake booster as recited in claim 3 further including:

a sleeve that surrounds a head on the output member, a reaction disc said sleeve preventing extrusion of said reaction disc during transfer of the operational force to the output member to allow the reaction forces to be transmitted to the control valve without being diminished.

5. The tandem brake booster as recited in claim 4 further including:

a shoulder on said first wall, said retainer plate and shoulder limiting the movement of said sleeve as said reaction disc allows said output member and first wall to move with respect to each other.

* * * * *